United States Patent Office 3,506,432
Patented Apr. 14, 1970

3,506,432
METHOD OF PRODUCING SODIUM BICARBONATE AND A FERTILIZER OF AMMONIUM AND POTASSIUM COMPOUNDS
Hideo Arita, Tokyo, Japan, assignor to Asahi Kasei Kogyo Kabushiki Kaisha, Kita-ku, Osaka, Japan, a corporation of Japan
No Drawing. Filed Apr. 19, 1966, Ser. No. 543,556
Claims priority, application Japan, Apr. 28, 1965, 40/24,723; Feb. 26, 1966, 41/11,474
Int. Cl. C05c 3/00; C05d 1/02; C01d 7/18
U.S. Cl. 71—61                                    2 Claims

ABSTRACT OF THE DISCLOSURE

Sodium bicarbonate and a fertilizer mixture of ammonium chloride with a potassium salt are produced by adding to a solution of sodium chloride and potassium chloride or sulfate at least 0.67 mol of ammonia per mol of sodium in the solution but less than the molar equivalent of the sodium. The solution is then saturated with carbon dioxide, attaining a pH of 6.0 to 8.5 and forming sodium bicarbonate at a temperature of 30° C.–60° C. The solution is cooled, and the precipitated sodium bicarbonate is separated at a temperature of 25° C. to 40° C. The resultant filtrate is then adjusted to a pH within the range of 8–9.5, and mixed crystals of sodium chloride and potassium chloride or potassium sulfate are added thereto. The filtrate is then cooled to precipitate the fertilizer mixture, which is separated at a temperature within the range of 5° C. to 20° C.

The present invention relates to a process for producing a mixed crystal of ammonium chloride and a potassium salt from a mixture of sodium chloride and potassium salt. More particularly, the invention concerns a process for producing on the one hand, pure sodium bicarbonate and on the other hand, a mixed crystal of ammonium chloride and a potassium salt, said process comprising dissolving a mixture of sodium chloride and a potassium salt in water, introducing ammonia gas therein to make the solution absorb the ammonia in an amount less than the equivalent molar amount of sodium in said solution, introducing carbon dioxide gas thereto to saturate the solution whereby sodium bicarbonate precipitates, separating the precipitated sodium bicarbonate crystals therefrom, adjusting the content of carbon dioxide in the solution and adding sodium chloride and potassium salt to the solution to precipitate as a product, a mixture of ammonium chloride and a potassium salt which are substantially free from the sodium salts. In a specific aspect, the invention involves a process for producing highly pure sodium bicarbonate containing substantially no impurities such as potassium salt and ammonium chloride and also a pure ammonium-potassium fertilizer containing substantially no sodium salts therein from a so-called rock salt.

In order to separate potassium salt from a rock salt having sodium chloride and a potassium salt as main ingredients or mixtures of said salts, the so-called flotation method or dissolution-extraction method has generally been employed. It has also been heretofore proposed that rock salt having sodium chloride and potassium chloride as the main ingredients, or a mixture of these two salts is first dissolved in water and treated with ammonia gas and carbon dioxide gas to obtain, on the one hand a pure sodium bicarbonate and on the other hand a valuable product which is employable as a fertilizer and which contains ammonium and potassium salt as main ingredients.

However, in the latter case in order to obtain a highly pure sodium bicarbonate and to eliminate the possible contamination of the product with potassium salt, it is required that the molar ratio of sodium chloride to potassium chloride in the raw material solution be at least 2.5 to 3:1, and in order to crystallize out the ammonium-potassium salt from the resulting filtrate, it is required that the concentration of ammonium carbonate in said solution be maintained at a considerably higher level by introducing 3.6 mols of ammonia and 1.45 mols of carbon dioxide gas per liter of said filtrate. Furthermore, in such a method, it is very difficult to separate the product from the solution because of a higher concentration of ammonia in the solution.

Considerable loss of the employed ammonia is also noted as being one of the disadvantageous points of the known method. After separating the ammonium-potassium salt, the solution is generally treated with carbon dioxide gas to produce sodium bicarbonate. However, the temperature rise in the solution is very poor because of the fact that no ammonia is employed in this step, which fact adversely affects the growth of sodium bicarbonate crystals and causes another set of disadvantages such as, for example, difficult separation of the fine product and severe contamination with various impurities. Another disadvantage of this method is that the obtained fertilizer also contains a considerable amount of sodium chloride as an impurity.

Accordingly, one object of the present invention is to provide a process for producing a highly pure sodium bicarbonate, which is substantially free from such contaminants as potassium salt and ammonium chloride, from a mixture of sodium chloride and potassium salt. Another object of the invention is to provide a process for producing a highly pure ammonium-potassium fertilizer product, containing no such impurities as sodium bicarbonate and sodium chloride, from a mixture of sodium chloride and potassium salt such as, for example, a rock salt.

Other objects of the present invention will be apparent from the description of the specification and the claims hereinafter described.

In accordance with the invention, it was found that a pure sodium bicarbonate and a pure ammonium-potassium fertilizer can be easily produced from a mixture of sodium chloride and a potassium salt such as, for example, a rock salt, by using the following procedures: an aqueous solution of sodium chloride and a potassium salt such as potassium chloride or potassium sulfate, after being treated with and absorbing ammonia in an amount less than the equivalent molar amount of sodium in said solution, i.e., less than 1 mol per mol of sodium, is saturated with carbon dioxide by introducing, preferably under pressure, carbon dioxide gas and thereafter, the thus formed and precipitated sodium bicarbonate crystals are separated by filtration from the solution. The reason why less than 1 mol of $NH_3$ is used is that when an excess amount of ammonia over the abovesaid equivalent to the molar amount of sodium in the solution is absorbed, there occurs an undesirable contamination of the sodium bicarbonate with potassium bicarbonate. On the other hand, when less than 0.67 mol of ammonia per mol of sodium is used, even through a detectable amount of sodium bicarbonate is formed, the rate of crystallization of the product is so low that the total yield over a specific period of time is quite low. Thus, at least 0.67 and less than 1 mol of ammonia per mol of sodium is used.

In carrying out the abovementioned procedure, a part of the carbon dioxide gas may be introduced into the solution together with the ammonia gas if desired. Preferably, the carbon dioxide gas is introduced in the solution under a pressure of about 1.2 to 3 atms. in terms of absolute pressure. After filtering the produced sodium bicarbonate, the filtrate is converted to a solution which is unsaturated with respect to carbon dioxide by using an appropriate manner for adjusting the pH to within the range of 8 to 9.5 such as, for example, releasing a part of the carbon dioxide gas from the solution under vacuum or normal pressure, introducing a small amount of ammonia into the solution, or adding a member selected from the group consisting of the hydroxides and oxides of alkali or alkaline earth metals to the solution, and then a mixture of sodium chloride and potassium salt is added to the solution to precipitate the mixed crystals of ammonium chloride and potassium salt from the solution. When vacuum distillation is employed in decreasing the amount of carbon dioxide contained in the solution, the temperature of the solution decreases in proportion thereto and hence the total energy for cooling the solution may be economized under actual operational conditions. Furthermore, the released carbon dioxide gas may be recycled for reuse in the sodium bicarbonate formation step.

In the first step for preparing sodium bicarbonate, when the carbon dioxide gas is introduced, preferably under pressure, into the solution, the pH of the resulting solution is in the range of 6.0 to 8.5. After separating the sodium bicarbonate crystals and converting the filtrate to a solution which is unsaturated with respect to carbon dioxide, the pH of the solution increases to 8–9.5 as a result of the loss of a part of the carbon dioxide from the solution.

As described hereinabove, in the method of this invention, the contamination of sodium bicarbonate with ammonium chloride is effectively controlled by using a limited amount of ammonia, i.e., an amount less than the molar equivalent of sodium in the solution and at least 0.67 mol per mol of sodium, and by thereafter saturating the solution with carbon dioxide.

As for the reaction temperature and filtration temperature of the product, though they may be freely selected in any temperature range according to the individual environmental conditions, sodium bicarbonate formation reaction is generally carried out at a temperature of between 30 and 60° C. (utilizing the heat of the exothermic reaction), while the filtration temperature is preferably in the range of between 25 and 40° C. As for the filtration temperature of the ammonium-potassium mixed salts, it is advantageously in the range of between 5 and 20° C., which is about 20° C. lower than that of the sodium bicarbonate filtration.

The potassium salt employed in the practice of the invention is in most cases potassium chloride; however a part or whole of said chloride may be replaced by potassium sulfate if desired. Likewise, a part or whole of the sodium chloride may be replaced by sodium sulfate. It should be, however, pointed out that when excess amounts of sulfates are employed over the equivalent to the total amount of potassium in the raw mixture, it tends to cause the contamination of ammonium-potassium mixed salts with sodium sulfate, so that the amount of potassium sulfate and sodium sulfate employed must be less than the equivalent to the total potassium salts employed as a raw material.

The invention is further illustrated by the following examples:

EXAMPLE 1

To 0.5 liter of an aqueous solution containing 1.27 mols of potassium chloride, 3.58 mols of sodium chloride and 1.85 mols of ammonium chloride per liter of said solution, 1.2 mols of ammonia was absorbed. Then the solution was saturated with carbon dioxide (1.2 mols) at 40° C., whereby the pH of the solution reached 7.5. The precipitated sodium bicarbonate was separated by vacuum filtration at 30° C. from the mother liquor, when the pH of the filtrate increased to 8.4 as a result of the escape of a part of the dissolved carbon dioxide gas from the solution. The filtrate was then mixed with a small amount of ammonia to adjust the pH to 9.0 and thereafter mixed with 191 grams of mixed crystals of potassium chloride and sodium chloride (70:30% by weight), and the mixture was stirred and allowed to cool to 10° C. The precipitated ammonium-potassium mixed salts were filtered at 10° C., and the remaining solution was again recycled to the first sodium bicarbonate precipitation step.

The thus obtained sodium bicarbonate was washed with methanol and the content of potassium salt and ammonium chloride in said product was checked. No contaminants were found therein. The other product of the process, i.e., the mixed salts of ammonium and potassium was also washed with methanol and checked the amount of sodium bicarbonate in the product, and no contaminant was found therein. Thus, each of the two products is substantially free of the other.

EXAMPLE 2

The same procedure as described in Example 1 was repeated in order to precipitate out pure sodium bicarbonate from the solution. After adjusting the pH of the filtrate to 8.0, a mixed salt of potassium chloride and sodium chloride containing 0.5% of calcium salt and 1.0% of magnesium salt was added to the filtrate to obtain an ammonium-potassium fertilizer product.

Repeating the abovesaid procedure several times, it was found that no potassium salt, magnesium salt or calcium salt was found in the sodium bicarbonate, while these salts are contained in the ammonium-potassium fertilizer product. Furthermore, it was found that the resulting sodium bicarbonate contained no crystals of potassium salt and ammonium chloride, and that the resulting ammonium-potassium fertilizer product contained no sodium bicarbonate.

EXAMPLE 3

To 0.5 liter of an aqueous solution containing 1.27 mols of potassium chloride, 3.58 mols of sodium chloride and 1.85 mols of ammonium chloride per liter of said solution, 1.7 mols of ammonia was absorbed. Then the solution was saturated with carbon dioxide gas at 40° C. by introducing the gas at an absolute pressure of 2.2 kg./cm.$^2$. When the pH of the solution reached 6.5, the precipitated sodium bicarbonate crystals were separated by filtering the mixture at 30° C. in vacuo. The pH of the filtrate changed to 7.8 as a result of this procedure. After adjusting the pH to 9.0 by introducing a small amount of gaseous ammonia, the solution was added with 210 grams of mixed crystals of potassium chloride and sodium chloride (70:30% by weight) under stirring and same was cooled at 10° C. The precipitated ammonium-potassium fertilizer product was separated and the filtrate was recycled to the sodium bicarbonate formation step.

The respective products were washed with methanol, and no contaminants were found in either product. However, the ammonium-potassium fertilizer product of this example contained about 1.5% by weight of sodium chloride.

EXAMPLE 4

To 0.5 liter of an aqueous solution containing 0.5 mol of potassium sulfate, 3.58 mols of sodium chloride and 1.85 mols of ammonium chloride per liter, 1.6 mols of ammonia was absorbed. Then the solution was saturated with carbon dioxide gas at 45° C. by introducing carbon dioxide gas, with the pressure of the gas being gradually increased to an absolute pressure of 2.5 kg./cm.$^2$. The precipitated sodium bicarbonate crystals were filtered at 35° C. in vacuo. The pH value of the resulting solution was 8.2. After adjusting the pH to 9.3 by adding a small amount of sodium hydroxide and potassium chloride, the solution was added to 150 grams of mixed crystals of potassium sulfate and sodium chloride (70:30% by weight), and the mixture was kept at 15° C. for one hour under stirring to complete the reaction therein. Thereafter the precipitated crystals were filtered at 15° C. (i.e., the ammonium-potassium fertilizer product), and the filtrate was added to 25 grams of sodium chloride at 10° C., as a result of which a mixture containing ammonium chloride, sodium chloride and potassium sulfate was precipitated therefrom. After separating the mixed crystals, the filtrate absorbed 1.6 mols of ammonia and then carbon dioxide, during which time the temperature of the solution was first raised to 45° C. and the pressure of the gas gradually increased to an absolute pressure of 1.8 kg./cm.$^2$ while the temperature of the solution decreased to 35° C. to secure the complete saturation of the solution with the gas. When the pH of the solution reached 6.8, the precipitated sodium bicarbonate crystals were filtered at 35° C. under suction and at the same time a portion of the carbon dioxide gas was evaporated from the filtrate to give a solution of pH of 8.6. To this solution, 140 grams of the mixed crystals employed in the previous step, and a mixture containing ammonium chloride, sodium chloride and potassium sulfate obtained in the previous step were added at 15° C., and thereafter the reaction product was filtered at the same temperature. The thusly obtained ammonium-potassium fertilizer product was treated with methanol and was checked for contaminants. The test results showed that the product was free from detectable amounts of impurities.

What is claimed is:

1. A process for producing sodium bicarbonate and a fertilizer mixture of ammonium and potassium salts, said process comprising dissolving a mixture of sodium chloride and a potassium salt selected from the group consisting of potassium chloride and potassium sulfate in water to form a solution, introducing gaseous ammonia to said solution in an amount which is at least 0.67 mol per mol of sodium in the solution and less than the molar equivalent of sodium in the solution, saturating the solution with gaseous carbon dioxide to attain a pH of the solution in the range of 6.0 to 8.5 and forming sodium bicarbonate at a temperature within the range of 30° C. to 60° C., allowing the solution to cool whereby the sodium bicarbonate precipitates out of the solution, separating the precipitated sodium bicarbonate from the solution at a temperature within the range of 25° C. to 40° C., adjusting the pH of the filtrate to within the range of 8 to 9.5, thereafter adding mixed crystals of sodium chloride and the potassium salt to the pH adjusted filtrate, cooling the filtrate to precipitate mixed crystals of ammonium chloride and the potassium salt and separating said mixed crystals at a temperature within the range of 5° C. to 20° C.

2. A process according to claim 1, wherein the introduction of gaseous carbon dioxide to the solution is effected under pressure.

References Cited

FOREIGN PATENTS

| | | |
|---|---|---|
| 210,399 | 4/1924 | Great Britain. |
| 230,796 | 6/1925 | Great Britain. |
| 131,870 | 2/1920 | Great Britain. |

S. LEON BASHORE, Primary Examiner

B. H. LEVENSON, Assistant Examiner

U.S. Cl. X.R.

23—65